US012783007B2

(12) United States Patent
Lu et al.

(10) Patent No.: US 12,783,007 B2
(45) Date of Patent: Nov. 3, 2026

(54) PORTABLE ELECTRONIC DEVICE HAVING OPTICAL COMMUNICATION MODULE

(71) Applicant: Getac Technology Corporation, New Taipei (TW)

(72) Inventors: Wei-Sen Lu, Taipei (TW); Cheng-Hung Chiang, Taipei (TW)

(73) Assignee: Getac Technology Corporation, New Taipei (TW)

( * ) Notice: Subject to any disclaimer, the term of this patent is extended or adjusted under 35 U.S.C. 154(b) by 80 days.

(21) Appl. No.: 18/960,090

(22) Filed: Nov. 26, 2024

(65) Prior Publication Data

US 2025/0306627 A1 Oct. 2, 2025

(30) Foreign Application Priority Data

Mar. 28, 2024 (CN) ........................ 202410366929.X

(51) Int. Cl.
*G06F 1/16* (2006.01)

(52) U.S. Cl.
CPC .......... *G06F 1/1622* (2013.01); *G06F 1/1698* (2013.01)

(58) Field of Classification Search
CPC ..... G06F 1/1622; G06F 1/1698; G06F 1/1607
See application file for complete search history.

(56) References Cited

U.S. PATENT DOCUMENTS 5,978,213 A * 11/1999 Vossler ................. G06F 3/0202 361/679.23
6,169,295 B1 * 1/2001 Koo ........................ H10F 55/25 438/26
9,503,801 B2 11/2016 Nagami
10,101,777 B1 * 10/2018 Tucker .................. G06F 1/1694
2005/0041980 A1 2/2005 Ueyanagi et al.
2010/0232799 A1 9/2010 Lueck
2019/0028600 A1 1/2019 Chiba et al.
2019/0305847 A1 10/2019 Sharp et al.

FOREIGN PATENT DOCUMENTS

| | | | |
|---|---|---|---|
| CN | 108412950 | A | 8/2018 |
| CN | 110324083 | A | 10/2019 |
| CN | 108515918 | B | 4/2020 |
| CN | 110798549 | B | 4/2021 |
| CN | 214613140 | U | 11/2021 |
| EP | 4506779 | A | 2/2025 |
| WO | 2019034864 | A1 | 2/2019 |
| WO | 2021040626 | A1 | 3/2021 |
| WO | 2022043214 | A1 | 3/2022 |
| WO | 2023066898 | A1 | 4/2023 |

OTHER PUBLICATIONS

Search report issued on Jul. 1, 2025 for EP application No. 25151764.5.

* cited by examiner

*Primary Examiner* — James Wu
(74) *Attorney, Agent, or Firm* — Troutman Pepper Locke LLP; Tim Tingkang Xia, Esq.

(57) ABSTRACT

A portable electronic device includes an apparatus body, a light emitting module, a light receiving module, and at least one transparent cover. The light emitting module and the light receiving module are disposed at the apparatus body and protrude from a surface of the apparatus body. The at least one transparent cover covers the light emitting module and the light receiving module.

20 Claims, 7 Drawing Sheets

PORTABLE ELECTRONIC DEVICE HAVING OPTICAL COMMUNICATION MODULE

CROSS-REFERENCE TO RELATED PATENT APPLICATION

This application claims the benefit of priority to China Patent Application No. 202410366929.X, filed on Mar. 28, 2024, in the People's Republic of China. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a portable electronic device, and more particularly to a portable electronic device having an optical communication module.

BACKGROUND OF THE DISCLOSURE

Light Fidelity (Li-Fi) refers to the transmission of information using optical communication technology. For example, a visible light source (e.g., a light bulb) is used as a signal transmitter, and the light can be controlled by a controller to be turned on or off, such as to control the communication between the signal transmitter and a terminal receiver. In the related art, an optical communication module is installed into a portable electronic device, such that light reception intensity of the optical communication module is limited by the casing of the portable electronic device.

In order to reduce the impact on a light receiving efficiency of the optical communication module, an area of the optical communication module is generally enlarged to increase the light receiving area. As a result, the size of the portable electronic device is increased, which is not conducive for being developed toward being thinner and more lightweight.

SUMMARY OF THE DISCLOSURE

The present disclosure provides a portable electronic device with an optical communication module, which can address the issue of the light receiving efficiency being affected due to limitations relating to receiving position and receiving angles of the optical communication module.

One of the technical aspects adopted by the present disclosure is to provide a portable electronic device, which includes an apparatus body, a light emitting module, a light receiving module, and at least one transparent cover. The light emitting module and the light receiving module are disposed at the apparatus body and protrude from a surface of the apparatus body. The at least one transparent cover covers the light emitting module and the light receiving module.

Therefore, in the portable electronic device provided by the present disclosure, by the structural design of the light emitting module and the light receiving module being disposed in the apparatus body and protruding from the surface of the apparatus body, the light emitting and receiving efficiencies of the light emitting module and light receiving module can be improved without increasing the size of the portable electronic device.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
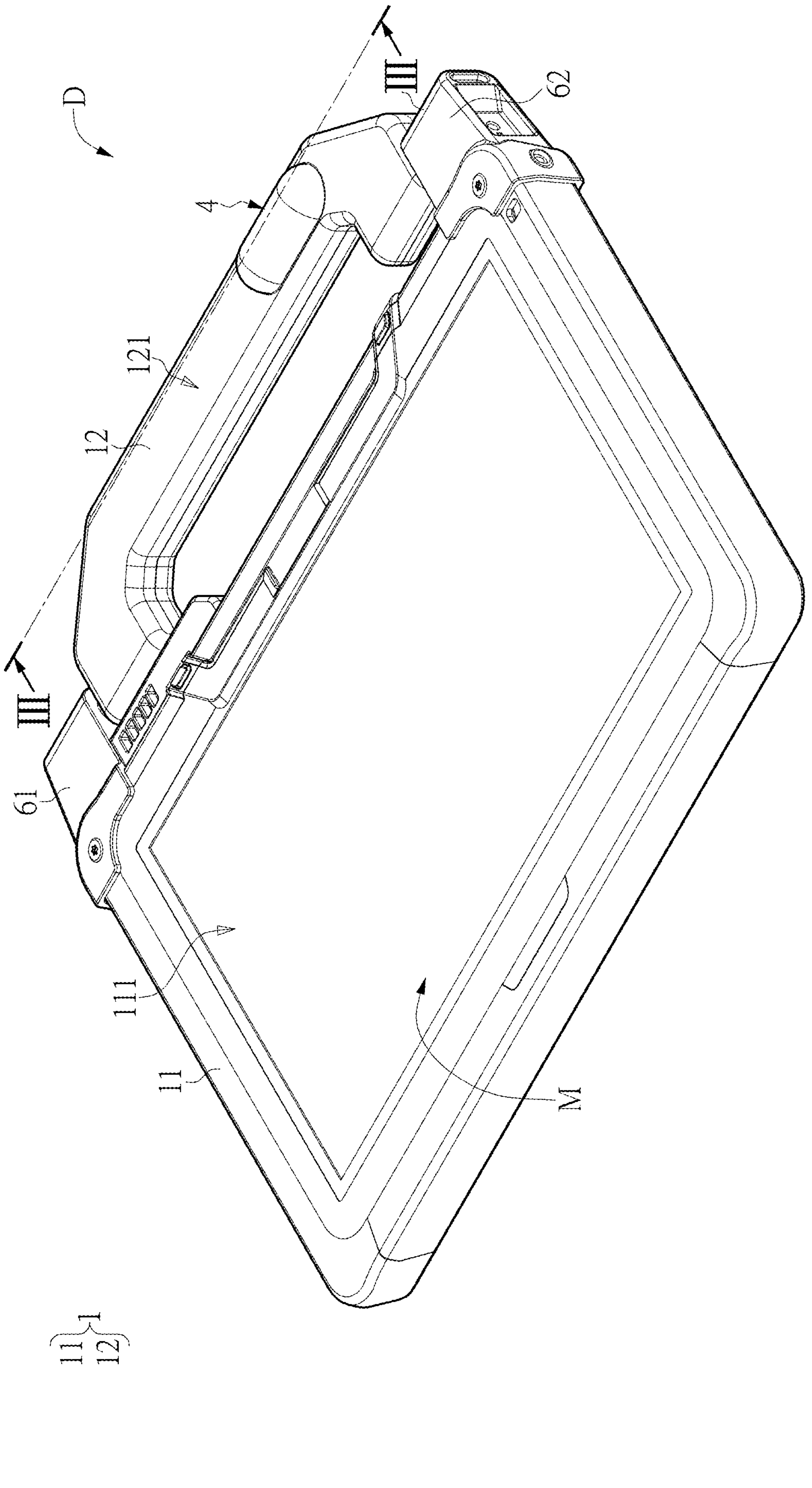
FIG. 1 is a schematic perspective view of a portable electronic device according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Figure 2:
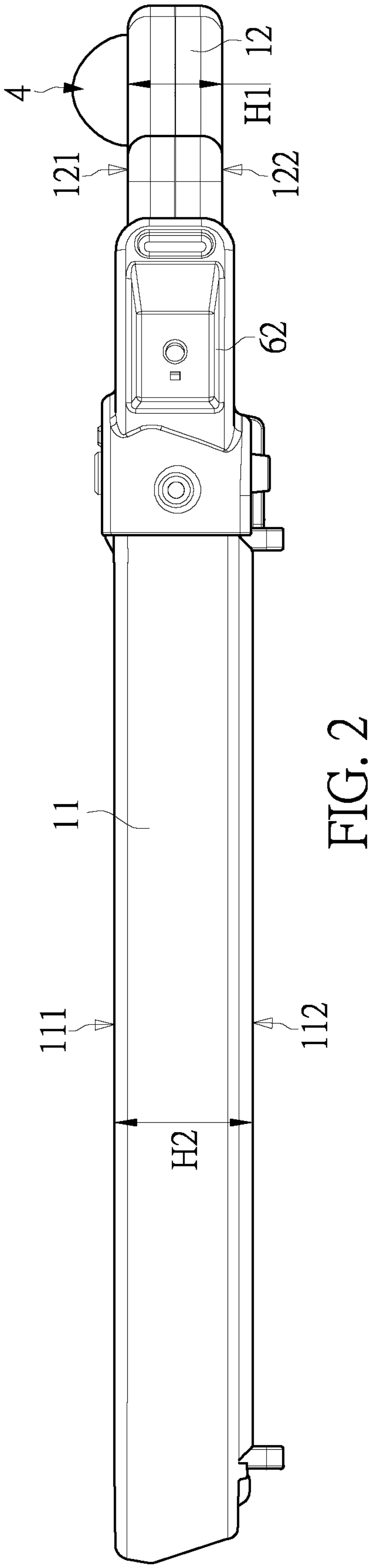
FIG. 2 is a schematic side view of the portable electronic device according to the first embodiment of the present disclosure.
Figure 3:
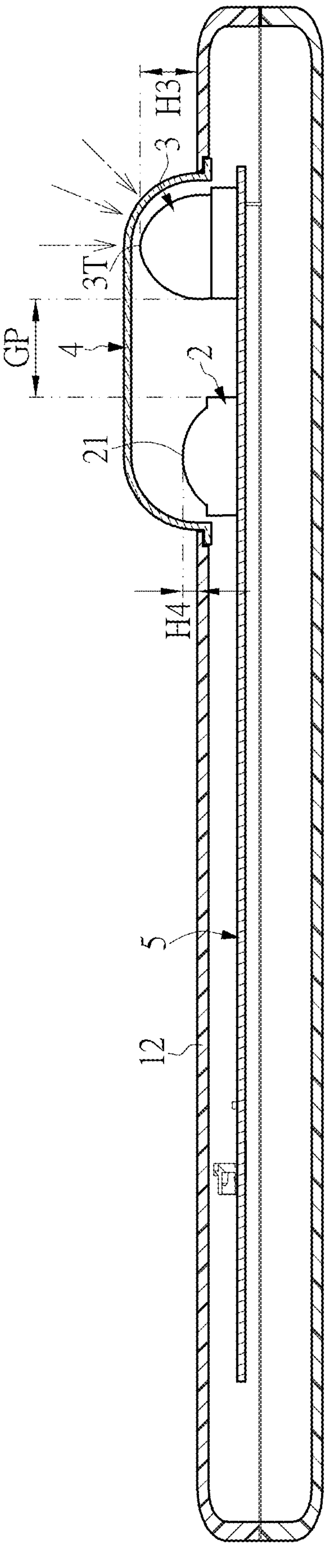
FIG. 3 is a schematic cross-sectional view taken along line III-III of FIG. 1.

Reference is made to FIG. 1 to FIG. 3. FIG. 1 is a schematic perspective view of a portable electronic device according to a first embodiment of the present disclosure. FIG. 2 is a schematic side view of the portable electronic device according to the first embodiment of the present disclosure. FIG. 3 is a schematic cross-sectional view taken along line III-III of FIG. 1. A first embodiment of the present disclosure provides a portable electronic device D, which includes an apparatus body 1, a light emitting module 2, a light receiving module 3, and at least one transparent cover 4. The light emitting module 2, the light receiving module 3, and the at least one transparent cover 4 are disposed at the apparatus body 1. Specifically, the apparatus body 1 includes a display body 11 and a rotatable component 12. The rotatable component 12 is pivotally connected to the display body 11, such that the rotatable component 12 rotates relative to the display body 11. The display body 11 is, for example, a tablet computer, and the rotatable component 12 is a rotatable handle installed at a side of the tablet computer.

Reference is made to FIG. 1 and FIG. 3. The rotatable component 12 has a first surface 121 and a second surface 122 that are opposite to each other. The light emitting module 2, the light receiving module 3, and the at least one transparent cover 4 are disposed at the rotatable component 12. The light emitting module 2 and the light receiving module 3 protrude from the first surface 121 of the rotatable component 12. The portable electronic device D of the present disclosure communicates by the Li-Fi technology through the light emitting module 2 and the light receiving module 3. The at least one transparent cover 4 covers the light emitting module 2 and the light receiving module 3. For example, the at least one transparent cover 4 is a three-dimensional light cover with a curved surface, which can maximize light receiving area of the at least one transparent cover 4 and improve light reception intensity of the light receiving module 3. Therefore, the light from the external environment that emits into the at least one transparent cover 4 from different directions can be completely received by the light receiving module 3, so as to further improve light reception intensity. Through the design of a surface curvature of the at least one transparent cover 4 being close to or equal to a spherical surface, the light from different directions can emit into the transparent cover 4 in a direction perpendicular to the surface of the transparent cover 4 and be completely received by the light receiving module 3, thereby reducing the probability of the light incident on the transparent cover 4 being partially refracted or reflected by the surface of the transparent cover 4. The material of the at least one transparent cover 4 is not limited in the present disclosure. For example, the at least one transparent cover 4 is configured to be penetrated by an infrared with a wavelength of 850 nm or above.

In the related art, the light emitting module and the light receiving module are installed inside and not exposed from the apparatus body. Therefore, the light transmitting and receiving efficiency of the light emitting module and the light receiving module is limited by the casing of the apparatus body. By comparison, in the present disclosure, the light emitting module 2 and the light receiving module 3 are arranged to protrude from the apparatus body 1 by design, such that the light emitting module 2 and the light receiving module 3 are not blocked by the casing of the apparatus body 1 when transmitting and receiving light.

Reference is made to FIG. 1 and FIG. 2. The display body 11 has a third surface 111 and a fourth surface 112 that are opposite to each other. The display body 11 includes a display screen M that is located at the third surface 111. The first surface 121 and the second surface 122 have a first distance H1 therebetween, the third surface 111 and the fourth surface 112 have a second distance H2 therebetween, and the first distance H1 is smaller than the second distance H2. In other words, a thickness of the rotatable component 12 is smaller than a thickness of the display body 11. Since the light emitting module and the light receiving module in the existing art are installed inside the apparatus body, such as inside the handle, the size (e.g., the thickness or volume) of the handle is enlarged to make it difficult for the user to hold the handle firmly. By comparison, in the present disclosure, the light emitting module 2 and the light receiving module 3 protrude from the rotatable component 12 (i.e., the handle) of the apparatus body 1, such that the size of the rotatable component 12 can be further reduced to allow the user to hold it more comfortably.

Reference is made to FIG. 3. A height of the light receiving module 3 is greater than a height of the light emitting module 2. Furthermore, a height H3 of the light receiving module 3 protruding from the first surface 121 of the rotatable component 12 is greater than a height H4 of the light emitting module 2 protruding from the first surface 121 of the rotatable component 12. The height H3 is equal to a vertical distance between a highest point 3T of the light receiving module 3 and the first surface 121. The height H4 is equal to a vertical distance between a highest point 2T of the light emitting module 2 and the first surface 121. Furthermore, a portion of the light receiving module 3 protruding from the first surface 121 and a portion of the light emitting module 2 protruding from the first surface 121 are separated from each other by a gap GP, and the gap GP is greater than or equal to the height H3. Through structural design of the gap GP being greater than or equal to the height H3, the light transmitting module 2 and the light receiving module 3 are separated by a large enough distance to prevent interference from each other. More specifically, the light emitted by the light emitting module 2 will not be blocked by the light receiving module 3, and the light emitting into the light receiving module 3 from the external environment will not be blocked by the light emitting module 2.

Second Embodiment

Figure 4:
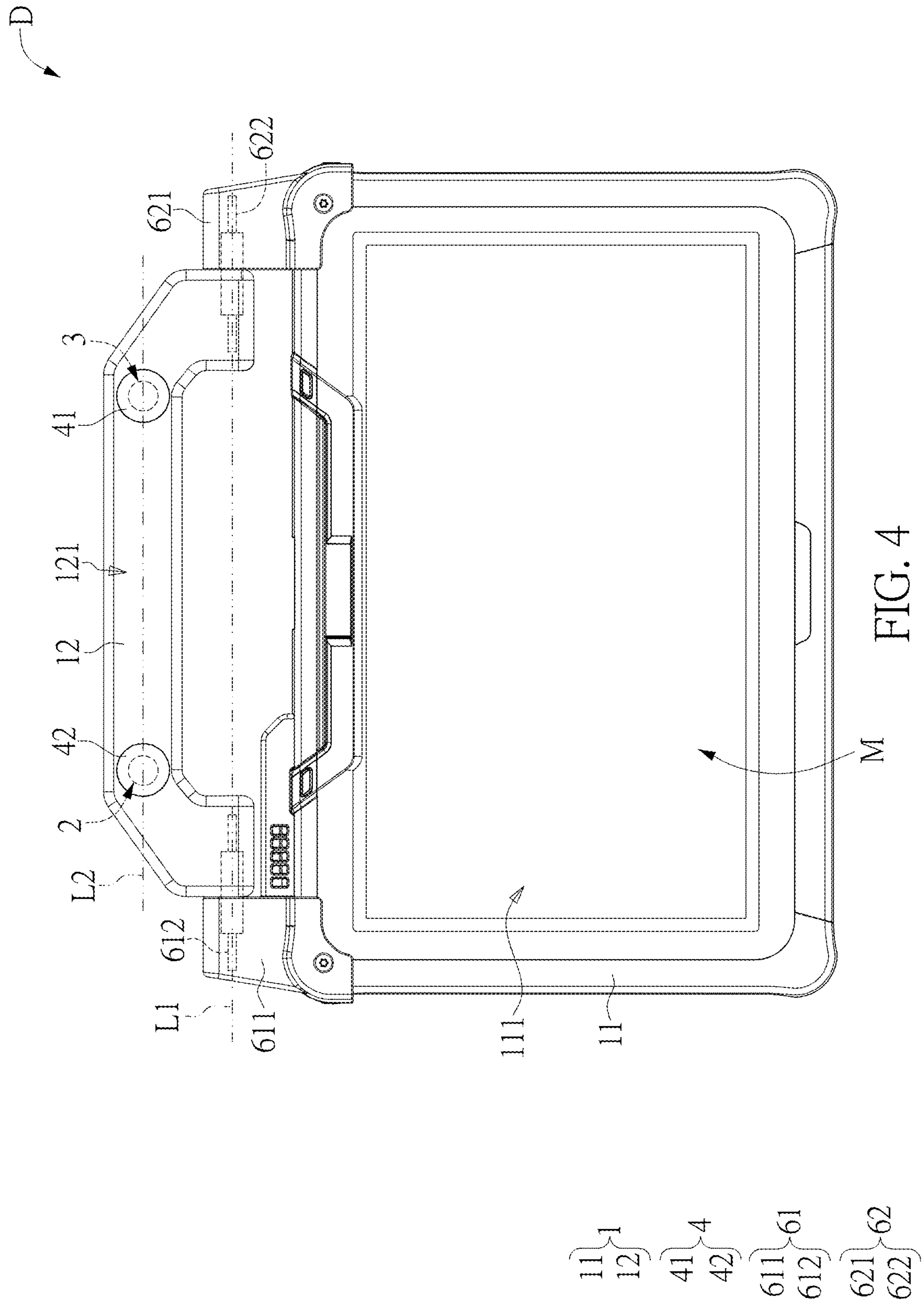
FIG. 4 is a schematic top view of a portable electronic device according to a second embodiment of the present disclosure.
Figure 5:
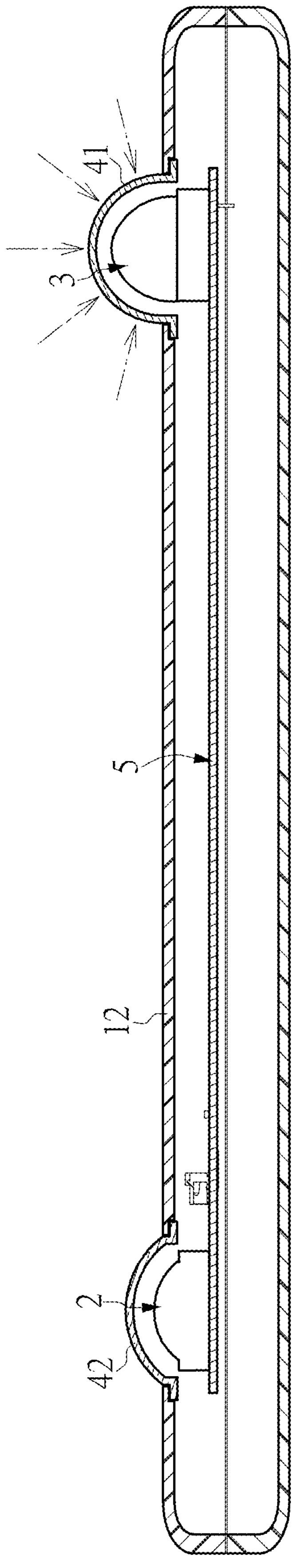
FIG. 5 is a schematic cross-sectional view of a rotatable component according to the second embodiment of the present disclosure.

Reference is made to FIG. 4 and FIG. 5. FIG. 4 is a schematic top view of a portable electronic device according to a second embodiment of the present disclosure. FIG. 5 is a schematic cross-sectional view of a rotatable component according to the second embodiment of the present disclosure. A second embodiment of the present disclosure provides a portable electronic device D, which includes an apparatus body 1, a light emitting module 2, a light receiving module 3, and at least one transparent cover 4. The portable electronic device D of the second embodiment is similar to the structure of the first embodiment, and the similarities will not be reiterated herein. The main difference between the second embodiment and the first embodiment is as follows: in the portable electronic device D of the second embodiment, the at least one transparent cover 4 includes a first transparent cover 41 and a second transparent cover 42 respectively covering the light receiving module 3 and the light emitting module 2. For example, each of the first transparent cover 41 and the second transparent cover 42 forms a hemispherical shape. Through the hemispherical structural design of the first transparent cover 41, the light receiving area of the transparent cover (e.g., the first transparent cover 41) can be maximized to improve the light emission intensity of the light emitting module 2 and the light reception intensity of the light receiving module 3.

Moreover, the surface curvatures of the first transparent cover 41 and the second transparent cover 42 are close to or equal to the spherical curvature, respectively. Therefore, the light from different directions can emit into the first transparent cover 41 in a direction perpendicular to the surface of the transparent cover and be completely received by the light receiving module 3, thereby reducing the light incident on the transparent cover being partially refracted or reflected by the surface of the transparent cover.

Similarly, in the second embodiment, a portion of the light receiving module 3 protruding from the first surface 121 and a portion of the light emitting module 2 protruding from the first surface 121 are separated from each other by a gap, and the gap is greater than or equal to the height of the light receiving module 3 protruding from the first surface 121. Therefore, the light transmitting module 2 and the light receiving module 3 are separated by a large enough distance to prevent interference from each other.

In addition, in the first and second embodiments (shown in FIGS. 1 and 4) of the present disclosure, the portable electronic device D further includes a first pivot member 61 and a second pivot member 62. Taking the second embodiment (shown in FIGS. 4 and 5) as an example, the first pivot member 61 and a second pivot member 62 are respectively disposed on two sides of the rotatable component 12. The first pivot member 61 and the second pivot member 62 are configured to be connected to the display body 11 and the rotatable component 12. The first pivot member 61 includes a first casing 611 and a first rotating shaft 612. The first rotating shaft 612 is rotatably connected between the rotatable component 12 and the first casing 611. The first casing 611 is disposed on the display body 11. The second pivot member 62 includes a second casing 621 and a second rotating shaft 622. The second casing 621 is disposed on the display body 11. The second rotating shaft 622 is rotatably connected between the rotatable component 12 and the second casing 621. Therefore, the rotatable component 12 rotates relative to the first casing 611 and the second casing 621 through the first rotating shaft 612 and the second rotating shaft 622. Moreover, the rotatable component 12 rotates relative to an axial line L1. The axial line L1 is an axial line of the rotating shafts of the handle (i.e., the rotatable component 12), that is, a connecting line connecting the first rotating shaft 612 and the second rotating shaft 622.

A line L2 connecting the light emitting module 2 and the light receiving module 3 is parallel to the axial line L1. Therefore, when the handle (i.e., the rotatable component 12) rotates, the light emitting module 2 and the light receiving module 3 rotate at a same angle. The illumination of a light source is directly proportional to the brightness of the light source and inversely proportional to the distance from the light source. If the emitting distance of the light emitting module 2 and the receiving distance of the light receiving module 3 are inconsistent, the intensity of the transmitting and receiving signals by the light emitting module 2 and the light receiving module 3 will be affected. Therefore, through the light emitting module 2 and the light receiving module 3 rotating at the same angle, the emitting distance of the light emitting module 2 and the receiving distance of the light receiving module 3 are the same, such that the powers of the light emitting module 2 and the light receiving module 3 when emitting and receiving light remain consistent with each other.

Figure 6:
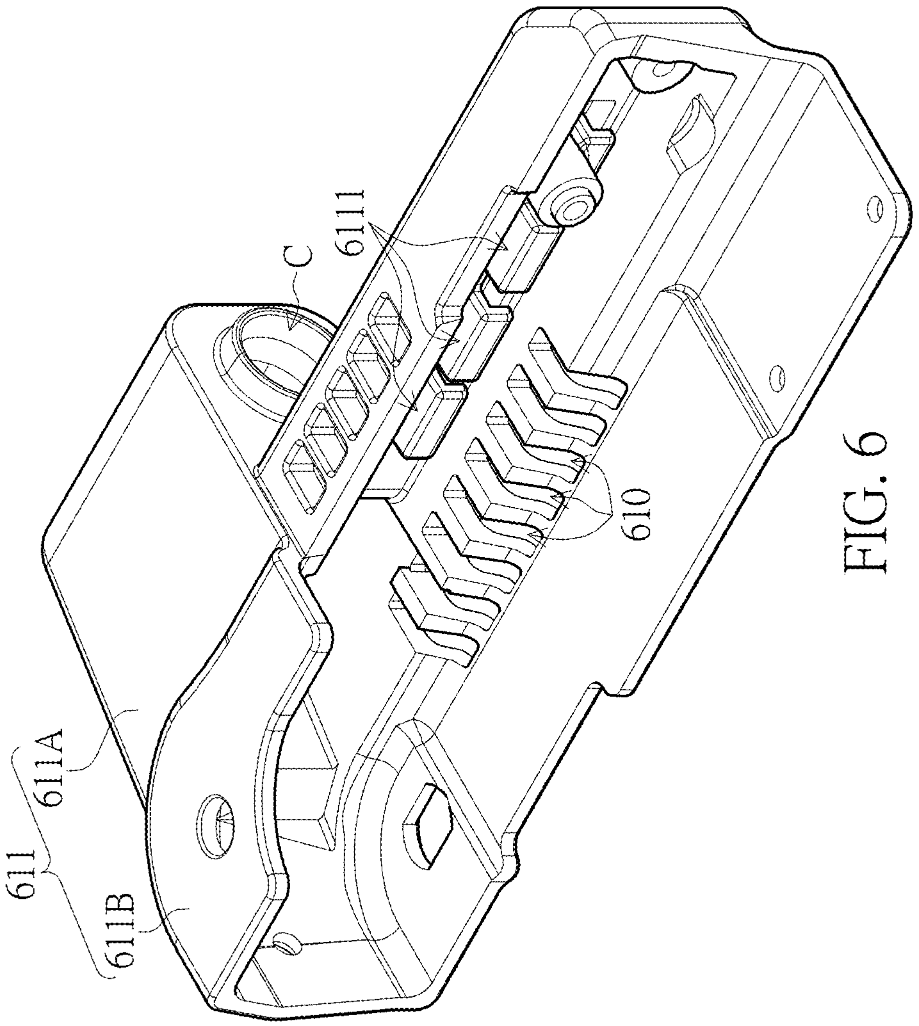
FIG. 6 is a schematic view of a first casing of the portable electronic device according to the present disclosure.
Figure 7:
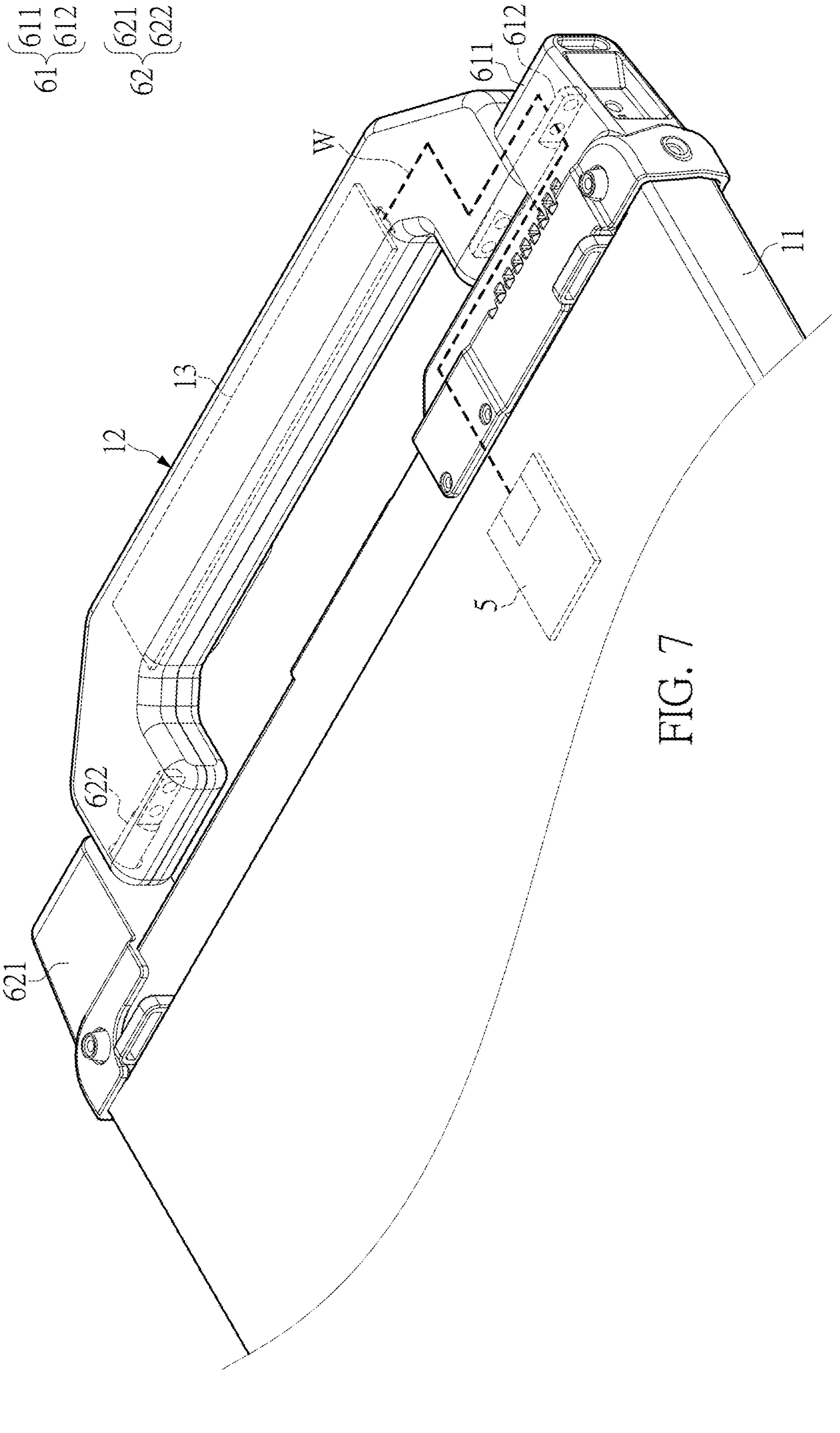
FIG. 7 is a schematic view of a backside of the portable electronic device according to the present disclosure.

Reference is made to FIG. 6 and FIG. 7. FIG. 6 is a schematic view of a first casing of the portable electronic device according to the present disclosure. FIG. 7 is a schematic view of a backside of the portable electronic device according to the present disclosure. Specifically, a shape of the first casing 611 is different from a shape of the second casing 621. The first casing 611 includes a head portion 611A and a body portion 611B. The head portion 611A includes a through hole C for the first rotating shaft 612 to be inserted. The body portion 611B is a part of the first casing 611 that is used for connecting to the display body 11. An internal space of the body portion 611B and an internal space of the display body 11 are in spatial communication with each other to allow wires for signal transmission to pass through. It should be noted that the second casing 621 also has a through hole that is similar to the first casing 611 for the second rotating shaft 622 to be inserted therein, but the second casing 621 has no space for the wires to pass through. Through the structural design of dividing the first casing 611 into the head portion 611A and the body portion 611B, the first rotating shaft 612 can be inserted into the through hole C of the head portion 611A, and the body portion 611B has enough space inside to accommodate other components.

The display body 11 further includes a control board 5, and the rotatable component 12 includes a circuit board 13 disposed therein. The control board 5 is electrically connected to the circuit board 13 through at least one conductive cable W. In the first and second embodiments of the present disclosure, the light emitting module 2 and the light receiving module 3 are both disposed on and electrically connected to the circuit board 13. As shown in FIG. 7, an extension direction of the at least one conductive cable W is indicated by a dotted line. One end of the at least one conductive cable W is electrically connected to the control board 5 inside the display body 11. The control board 5 can be, for example, a central processing unit (CPU) or a network interface card, but the present disclosure is not limited thereto. Another end of the at least one conductive cable W passes through the through hole C of the head portion 611A, and is electrically connected to the circuit board 13 inside the rotatable component 12 after passing through the body portion 611B.

The location of the circuit board 13 is not limited in the present disclosure. In other embodiments, the circuit board 13 is disposed on the first pivot member 61 or the second pivot member 62. For example, the circuit board 13 is disposed in the first casing 611 or the second casing 621, that is, the light receiving module 3 and the light emitting module 2 are not disposed on the circuit board 13. Therefore, the light receiving module 3 and the light emitting module 2 are electrically connected to the circuit board 13 through other conductive cables, and the control circuit board 5 is electrically connected to the circuit board 13 through the at least one conductive cable W.

Reference is further made to FIGS. 6 and 7. A wall of the body portion 611B has a plurality of heat dissipation holes 610. The first casing 61 includes a cable tray 6111 therein. The cable tray 6111 is adjacent to the plurality of heat dissipation holes 610. The plurality of heat dissipation holes 610 are in communication with the internal space of the body portion 611B and the internal space of the display body 11, so that the heat energy generated by the internal components of the display body 11 can be diffused through the plurality of heat dissipation holes 610 to improve the heat dissipation effect. Furthermore, the display body 11 includes a fan (not shown in the figures) therein, and the fan is close to the plurality of heat dissipation holes 610. Therefore, the heat dissipation effect can be further enhanced through the configuration of the fan.

In addition, the at least one conductive cable W is used for being stored in the cable tray 6111. A quantity of the conductive cable W is not limited in the present disclosure. When the quantity of the conductive cable W is plural, the conductive cables W can be organized and stored in the cable tray 6111 to avoid breakage from being entangled with each other or excessively bent.

In the portable electronic device D provided by the present disclosure, by the structural design of the light emitting module 2 and the light receiving module 3 being disposed in the apparatus body 1 and protruding from the surface of the apparatus body 1, the light emitting and receiving efficiencies of the light emitting module 2 and light receiving module 3 can be improved without increasing the size of the portable electronic device D.

In the related art, the light emitting module and the light receiving module are installed inside and not exposed from the apparatus body. Therefore, the light transmitting and receiving efficiency of the light emitting module and the light receiving module is limited by the casing of the apparatus body. By comparison, in the present disclosure, the light emitting module 2 and the light receiving module 3 are arranged to protrude from the apparatus body 1 in design, such that the light emitting module 2 and the light receiving module 3 are not blocked by the casing of the apparatus body 1 when transmitting and receiving light.

Moreover, since the existing light emitting module and the light receiving module are installed inside the apparatus body such as the handle, the size (e.g., the thickness or volume) of the handle is enlarged to make it difficult for the user to hold the handle firmly. By comparison, in the present disclosure, the light emitting module 2 and the light receiving module 3 protrude from the rotatable component 12 (i.e., the handle) of the apparatus body 1, such that the size of the rotatable component 12 can be further reduced to allow the user to hold it more comfortably.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A portable electronic device, comprising:

an apparatus body, comprising a display body and a rotatable component, wherein the rotatable component is pivotally connected to the display body, and the rotatable component has a first surface and a second surface that are opposite to each other;

a light emitting module and a light receiving module disposed at the apparatus body in the rotatable component and protruding from the first surface;

a first pivot member and a second pivot member that are respectively disposed on two sides of the rotatable component, wherein the first pivot member and the second pivot member are configured to be connected to the display body and the rotatable component, the first pivot member comprises a first casing and a first rotating shaft, the first casing is disposed on the display body, the first casing has a plurality of heat dissipation holes, the first rotating shaft is connected between the rotatable component and the first casing, the second pivot member comprises a second casing and a second rotating shaft, the second casing is disposed on the display body, the second rotating shaft is connected between the rotatable component and the second casing, and the rotatable component rotates relative to the first casing and the second casing through the first rotating shaft and the second rotating shaft; and at least one transparent cover covering the light emitting module and the light receiving module.

2. The portable electronic device according to claim 1, wherein the display body has a third surface and a fourth surface that are opposite to each other, the display body comprises a display screen located at the third surface; wherein the first surface and the second surface have a first distance therebetween, the third surface and the fourth surface have a second distance therebetween, and the first distance is smaller than the second distance.

3. The portable electronic device according to claim 1, wherein a height of the light receiving module protruding from the first surface of the rotatable component is greater than a height of the light emitting module protruding from the first surface of the rotatable component.

4. The portable electronic device according to claim 3, wherein a portion of the light receiving module protruding from the first surface and a portion of the light emitting module protruding from the first surface are separate from each other by a gap, and the gap is greater than or equal to the height of the light receiving module protruding from the first surface of the rotatable component.

5. The portable electronic device according to claim 1, further comprising a circuit board disposed inside the rotatable component, wherein the light emitting module and the light receiving module are electrically connected to the circuit board.

6. The portable electronic device according to claim 1, wherein the at least one transparent cover is configured to be penetrated by an infrared with a wavelength above 850 nm.

7. The portable electronic device according to claim 1, wherein a surface of the at least one transparent cover forms a curved shape.

8. The portable electronic device according to claim 1, wherein the at least one transparent cover comprises a first transparent cover and a second transparent cover, and the first transparent cover and the second transparent cover respectively cover the light receiving module and the light emitting module.

9. The portable electronic device according to claim 8, wherein each of the first transparent cover and the second transparent cover forms a hemispherical shape.

10. The portable electronic device according to claim 1, wherein the first casing comprises a cable tray therein, and the cable tray is adjacent to the plurality of heat dissipation holes.

11. The portable electronic device according to claim 10, wherein the display body further comprises a control board, the control board is electrically connected to the circuit board through at least one conductive cable, the light emitting module and the light receiving module are electrically connected to the control board, and the at least one conductive cable is configured to be stored in the cable tray.

12. The portable electronic device according to claim 1, wherein the rotatable component rotates relative to a virtual axial line, and a virtual line connecting the light emitting module and the light receiving module is parallel to the virtual axial line.

13. The portable electronic device according to claim 12, wherein the virtual axial line is a virtual connecting line that connects the first rotating shaft and the second rotating shaft.

14. A portable electronic device, comprising:

an apparatus body, comprising a display body and a rotatable component, wherein the rotatable component is pivotally connected to the display body, the rotatable component rotates relative to a virtual axial line, and the rotatable component has a first surface and a second surface that are opposite to each other;

a light emitting module and a light receiving module disposed at the apparatus body in the rotatable component and protruding from the first surface, and a virtual line connecting the light emitting module and the light receiving module is parallel to the virtual axial line;

a first pivot member and a second pivot member that are respectively disposed on two sides of the rotatable component, wherein the first pivot member and the second pivot member are configured to be connected to the display body and the rotatable component, the first pivot member comprises a first rotating shaft, the second pivot member comprises a second rotating shaft, and the virtual axial line is a connecting line that connects the first rotating shaft and the second rotating shaft; and at least one transparent cover covering the light emitting module and the light receiving module.

15. The portable electronic device according to claim 14, wherein the display body has a third surface and a fourth surface that are opposite to each other, the display body comprises a display screen located at the third surface; wherein the first surface and the second surface have a first distance therebetween, the third surface and the fourth surface have a second distance therebetween, and the first distance is smaller than the second distance.

16. The portable electronic device according to claim 14, wherein a height of the light receiving module protruding from the first surface of the rotatable component is greater than a height of the light emitting module protruding from the first surface of the rotatable component.

17. The portable electronic device according to claim 16, wherein a portion of the light receiving module protruding from the first surface and a portion of the light emitting module protruding from the first surface are separate from each other by a gap, and the gap is greater than or equal to the height of the light receiving module protruding from the first surface of the rotatable component.

18. The portable electronic device according to claim 14, further comprising a circuit board disposed inside the rotatable component, wherein the light emitting module and the light receiving module are electrically connected to the circuit board.

19. The portable electronic device according to claim 14, wherein the at least one transparent cover is configured to be penetrated by an infrared with a wavelength above 850 nm.

20. A portable electronic device, comprising:

an apparatus body including a display body and a rotatable component, wherein the rotatable component is pivotally connected to two sides of the display body, and the rotatable component having a first surface and a second surface that are opposite to each other;

a light emitting module and a light receiving module disposed in the rotatable component and protruding from the first surface; and at least one transparent cover covering the light emitting module and the light receiving module;

wherein the light emitting module and the light receiving module rotates relative to a virtual axis, and the light emitting module and the light receiving module are disposed at a distance along a direction parallel to the virtual axis;

wherein a height of the light receiving module protruding from the first surface of the rotatable component is greater than a height of the light emitting module protruding from the first surface of the rotatable component.

* * * * *